Aug. 1, 1961  A. PONS Y COMPANYS  2,994,331
AUTOMATIC CLEANING AND STIRRING MACHINE
Filed Oct. 29, 1958  4 Sheets-Sheet 1

INVENTOR
Amedee Pons y Companys
BY
ATTORNEY

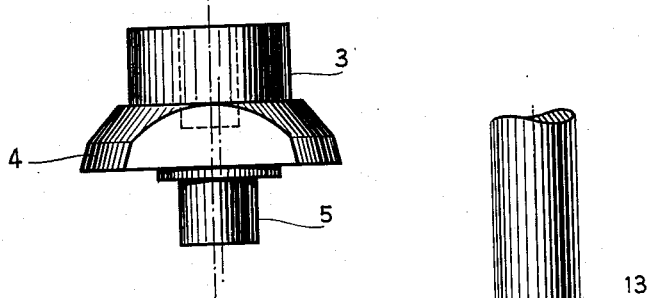
Fig. 3
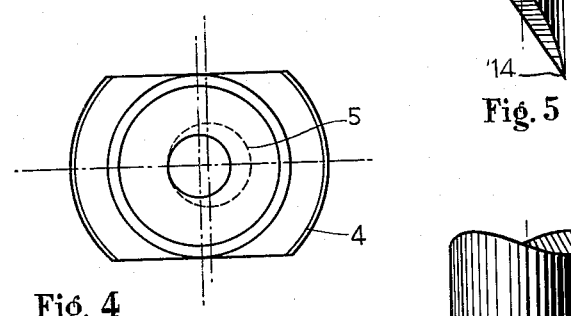
Fig. 4
Fig. 5
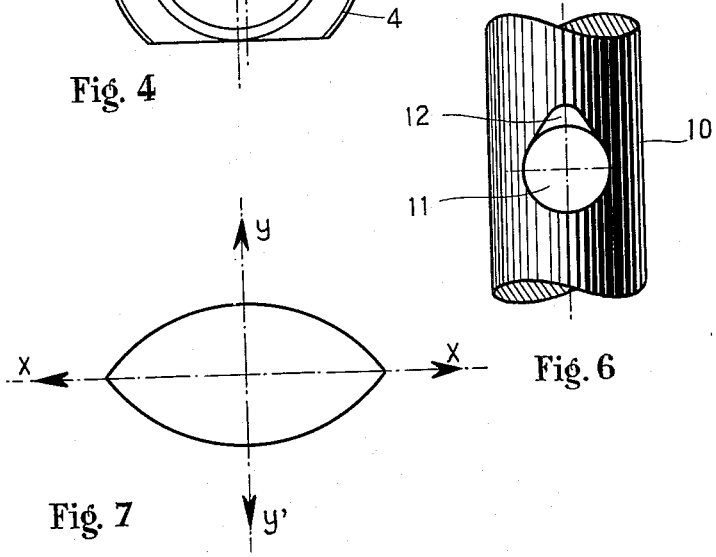
Fig. 6
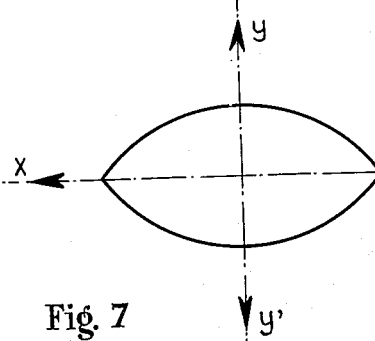
Fig. 7

Aug. 1, 1961    A. PONS Y COMPANYS    2,994,331
AUTOMATIC CLEANING AND STIRRING MACHINE
Filed Oct. 29, 1958    4 Sheets-Sheet 4

INVENTOR
Amedee Pons y Companys
BY Irwin S. Thompson
ATTORNEY

United States Patent Office 2,994,331
Patented Aug. 1, 1961

2,994,331
AUTOMATIC CLEANING AND STIRRING MACHINE
Amédée Pons y Companys, 21 Ave. Chamier, Montauban, Tarn-et-Garonne, France
Filed Oct. 29, 1958, Ser. No. 770,511
Claims priority, application France Nov. 9, 1957
2 Claims. (Cl. 134—140)

My invention has for its object improvements in cleaning machines of the type including a basket containing the articles to be cleaned under stirring containers inside one or more cleaning baths.

My invention has more particularly for its object means for the automatic adjustment of the intensity of said stirring as required by the weight of such articles.

I also provide said machine with means for ensuring automatic synchronism between the movements assumed by the container and the position assumed by the immersed basket and also with an arrangement for preheating the scouring liquid through the agency of infra-red rays and the drying of the cleaned articles by same rays. Lastly, I improve the actual basket structure by means of perforations which further the entrance of liquid into it.

I have already described in my prior British specification No. 733,258 various embodiments of a cleaning machine and of its auxiliaries which provide excellent results in the cleaning of various articles, chiefly watches and the like clockwork parts. The material serving for the execution of the mechanisms of such machines were selected hitherto only by reason of their resistance to torsional and flexional stresses and, generally speaking, to the mechanical and dynamic strains to which are subjected such mechanisms assuming high-speed vibratory movements.

However, I have found that the perfect cleaning of an article requires a movement the amplitude of which is proportional to its weight. Now, nothing has been provided hitherto for bestowing the parts forming the mechanism of such cleaning machines with a yieldingness allowing an automatic adjustment of the magnitude of the stirring procedure as a function of the weight of the parts subjected to the cleaning procedure.

My invention solves this problem by resorting for the execution of certain parts of cleaning machines to materials having elastic properties which are associated with resistance to the straining arising through the movements of the parts, and in particular to plastic materials, such as superpolyamides, and the like.

Experience shows that this novel use of such plastic materials for the purposes specified leads to the desired result and the amplitude of the movement increases in direct relationship with the mass of the articles subjected to a stirring, which leads to an automatic adjustment of the cleaning movement.

I have illustrated in accompanying drawings a preferred embodiment of my invention. In said drawings:

FIGS. 3 and 4 are respectively an elevational and a plan view of one of the driving members of the mechanism.

FIGS. 5 and 6 illustrate the shape of a removable pin and of the opening through which it enters the driving spindle.

FIG. 7 illustrates diagrammatically the path followed by the basket during its reciprocation.

Figure 1:
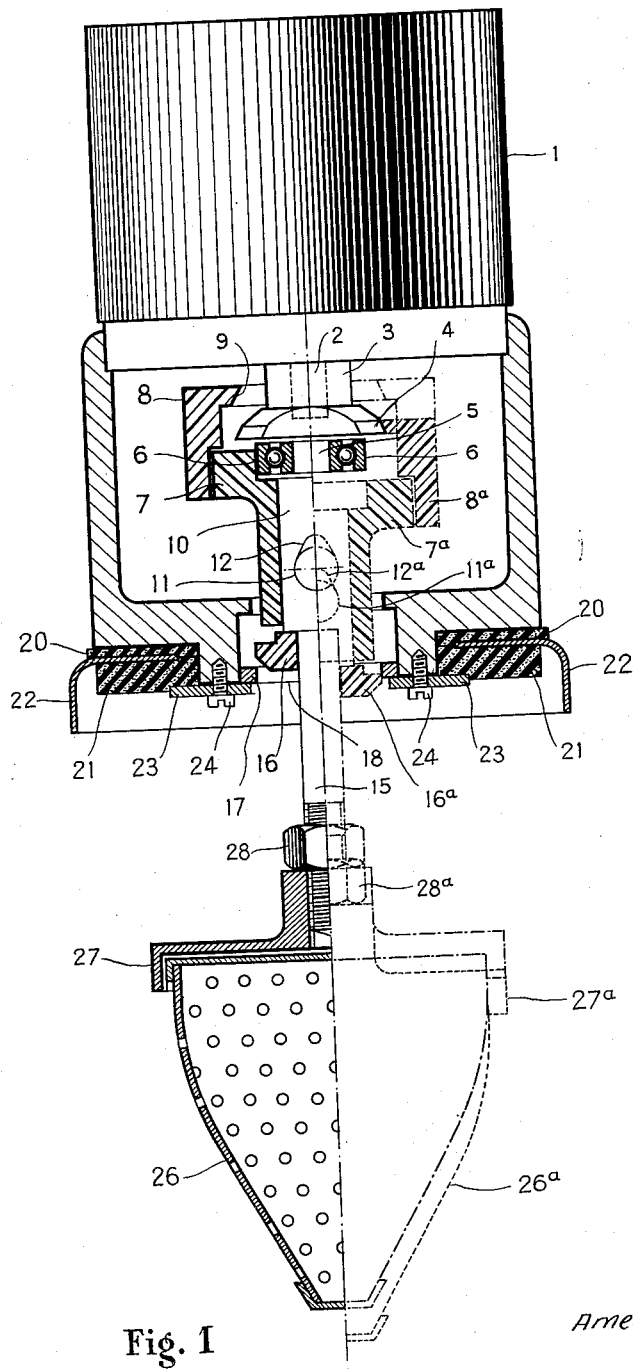
FIG. 1 is a vertical sectional view of the mechanism of the cleaning machine.

As illustrated in FIG. 1, the mechanism includes an electric motor 1 to the shaft 2 of which is secured a driving member 3 made of plastic material and illustrated with further detail in FIGS. 3 and 4. Said driving member 3 is provided with a substantially frustoconical collar 3 and with an eccentric stud 5 on which is fitted rockably a ball bearing 6 of the so-called ball and socket type. Said ball bearing is housed inside the head 7 fitted inside a driving sleeve or cylinder 8, said head and cylinder being both made of plastic material. The cylinder 8 is provided at its upper end with a frustoconical opening 9 the outline of which matches that of the upper surface of the collar 4 above which it lies.

The head 7 is fitted over a spindle 10 generally made of acid-proof steel, although it may as well be made of plastic material so as to increase the sensitivity of the apparatus. Said spindle is provided with a diametrical port 11, the upper edge of which is bevelled as shown at 12 (FIG. 6) and which is engageable by a pin 13 of plastic material, the end of which tapers as shown at 14 (FIG. 5).

The lower end of the spindle 10 carries a rocking member 15 over the upper end of which is fitted a ring 16 of plastic material adapted to slide vertically through a steel ring 17 lining the circular opening 18 of the casing 19 enclosing the whole system.

Figure 8:
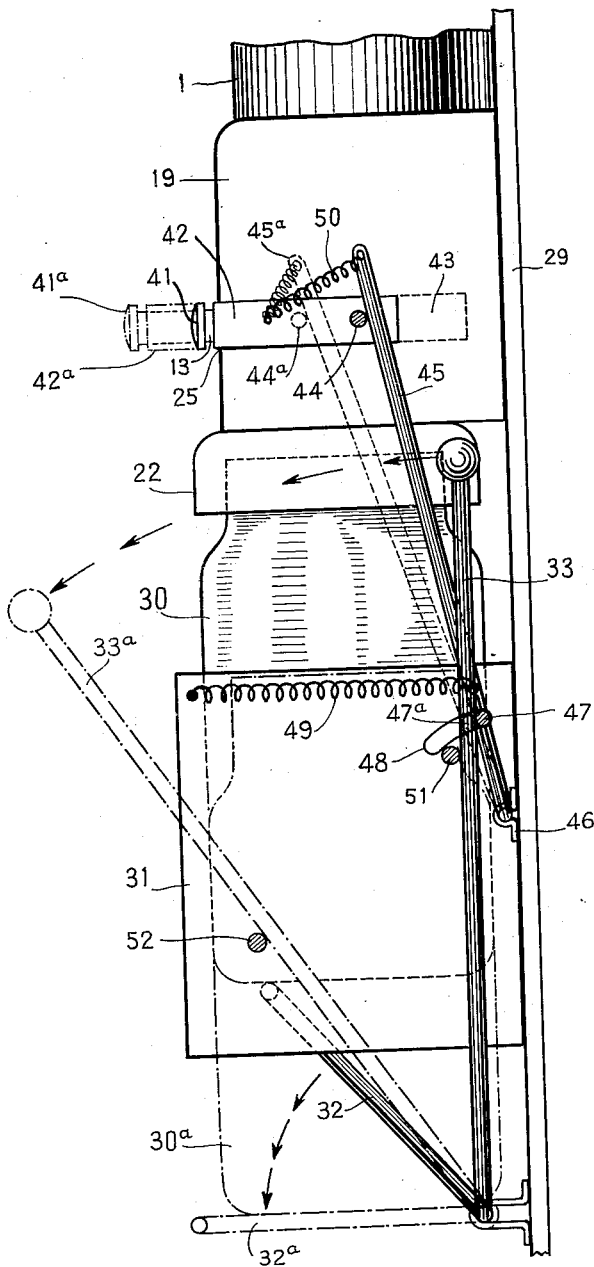
FIG. 8 illustrates the control means producing automatically the successive movements to be executed by the machine.

Said casing 19 made of aluminium or of plastic material is provided at its lower end with two rubber washers 20 and 21 acting as damping members and between which is clamped a cap 22 engaging the upper end of the container which is not illustrated in FIG. 1 and inside which the articles to be treated are immersed. These washers 20 and 21 are secured to the bottom of the casing 19 by a metal annulus 23 secured to the casing by screws 24. The front wall of the casing 19 is provided with a circular opening 25 as shown in FIG. 8, and through which the pin 13 may enter said casing.

A water-permeable basket 26 is secured to a fitting 27 the upper central tubular section of which is threadedly engaged over the lower threaded end of the rocking member 15 over which it is held fast by the counter-nut 28. It should be remarked that, in said basket, the conventional metal trellis-work may be advantageously replaced by a perforated metal sheet, the perforations of which further the passage of water through them.

Figure 2:
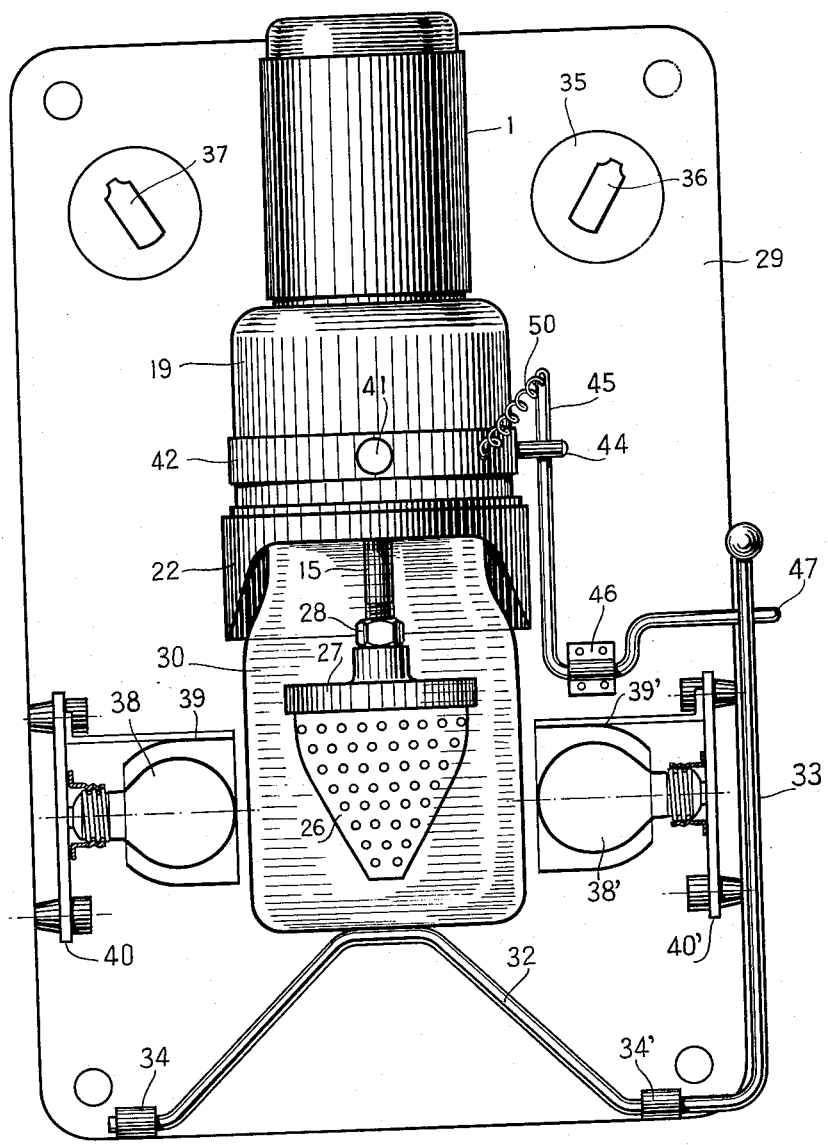
FIG. 2 is an elevational front view of the machine after removal, for sake of clarity, of the front protecting wall.

As illustrated in FIG. 2, the machine includes an outer carrier plate 29 adapted to be secured to a carrier wall and to which is secured the motor 1 mounted on the casing 19 carried in its turn as described by the cap 22 engageable over the container 30 filled with a suitable liquid in which the basket 26 is immersed. Said carrier plate 29 is rigid at its lower end with a protecting plate 31 of a suitable height including a lateral and a front section as illustrated in FIG. 8, but it is omitted for sake of clarity in FIGS. 1 and 2.

The container 30 is carried by the operative crank pin of a carrier crank shaft 32 terminating with a control lever 33 and revolubly carried in two aligned bearings 34 and 34' secured to the bottom of the carrier plate 29. The latter carries furthermore a time switch 35 which allows adjusting the duration of the different operations to be executed and which is controlled by the knob 36. A further knob 37 controls the ignition of two lamps 38 and 38' producing infra-red rays, said lamps being associated with removable reflectors 39 and 39', each system 38—39 and 38'—39' being secured to a corresponding plate 40 or 40' rigid with the carrier plate 29 to either side of the container 30.

The actual automatically operating system is shown with further detail in FIG. 8. In said FIG. 8, it is apparent that the end of the pin 13 projecting out of the casing 19 is secured through a blind nut 41 to a double-armed strap 42 adapted to be shifted horizontally to thus execute a translational movement during which the two lateral arms of said straps slide freely inside two guiding grooves 43 provided outwardly of the two opposite sides of the casing 19. To one of the lateral arms of said strap 42 is secured a stud 44 adapted to be engaged by a bent rod 45 which is shown throughout its length in FIG. 2, said rod pivoting inside a bearing 46 secured to the carrier plate 29. The lower bent section 47 of said rod 45 projects laterally by a predetermined length through a slot 48 provided in the lateral section of the protecting plate 31. Furthermore, the rod 45 is connected at a suitably selected point of its medial section with the inner surface of the front section of the protecting plate 31 by a return spring 49. A further spring 50 operating against expansion connects the upper end of the rod 45 with the strap 42. Lastly, two stops 51 and 52 are provided for the lever 33 on the outside of the plate 31 at suitable points thereof.

The operation of the system described is as follows:

At the beginning of the operation, the basket carrying the articles to be cleaned is immersed inside the container 30 which is fitted underneath the cap 22 and is held in position by the crank pin of the crankshaft 32, the lever 33 controlling said crankshaft being raised and wedged behind the stationary stud 51 while engaging the end 47 of the lever 45 which has been urged into the end of the corresponding slot 48 (FIG. 8), the pin 13 being in its lowermost position. Infra-red ray-producing lamps 38 and 38' are then ignited for the time defined by the time-switch with a view to producing a suitable preliminary heating of the liquid. The motor being then started, the eccentric stud 5 driven by the shaft 2 of the motor 1 imparts to the basket system a pendular movement round the pin 13, said movement being transmitted by the ball bearing 6. The time-switch having defined the end of the time allotted for the cleaning procedure, the lever 33 is drawn forwardly over the stud 51 and held fast behind the stud 52. The container 30 which is carried by the crank pin of the crankshaft 32 rigid with the lever 33 sinks now so as to occupy its draining position defined by the indicia a for the reference numbers. At the same time, the rod 45, subjected to the action of the return spring 49 and the bent end 47 of which is thus released and slides forwardly of the slot 48, pushes forwardly the stud 44 on the strap 42 which latter slides over the casing 19 along which it is guided by the grooves 43, which results in making the pin 13 move out of its recess 11 extending transversely of the spindle 10 of the basket carrier and of the head 7.

FIG. 1 shows in dotted lines in its right hand sectional half parts with reference numbers provided with the indicia a: the pin 13 being drawn out of its recess, the whole basket system including the members 7, 8, 10, 15 and 16 sinks and the ring 16 returns freely into engagement with the outer ring 17 while the roller bearing 6 and the eccentric stud 5 are no longer fitted inside the head 7 and the driving sleeve or cylinder 8 engages the collar 4 of the driving body 3 which makes the whole arrangement assume a rotary movement whereby the parts contained in the basket are thus subjected to a draining under the action of centrifugal force.

In order to return the machine into its operative cleaning position, the lever 33 is urged rearwardly and it is set behind the stud 51 which holds it in position. The crank pin on the crank shaft 32 reengages the bottom of the container 30 as illustrated in FIG. 2. Since the lever 33 has shifted rearwardly the projecting end 47 of the rod 45 along the slot 48 into its rearmost position, the rod 45 follows said movement and shifts back through the agency of the spring 50 the strap 42 and consequently the pin 13 the tapering end 14 of which lies at the level of the correspondingly bevelled section 12 of the por 11 in the lowered basket system. The motor bein; then started, the port 11 is brought into registry witl the tapering end 14 engaging said bevelled section s( that said tapering end 14 is urged by the spring 50 int( said port 11, which constrains the whole movable systen to rise and to return into the position illustrated in solic lines in the cross-sectional FIG. 1 on the left hand side thereof. The machine is now ready to assume again ɛ rocking movement.

The two stirring and draining operations may be repeated in sequence a number of times with different liquids, the container 30 being possibly removed and changed after a complete forward shifting of the lever 33 and consequently collapsing of the crank pin of the crank shaft 32 engaging the container 30.

Finally, the motor is stopped and there is provided a final and perfect drying of the cleaned articles carried by the basket in its inoperative position, said drying being obtained through the agency of the infra-red rays produced by the lamps 38 and 38'.

The movement and the variations of its amplitude will be clearly understood from inspection of FIGS. 3, 4 and 7. Fig. 3 is an elevational view of the member 3 carrying a frusto-conical collar 4 and an eccentric stud 5 while FIG. 4 shows clearly the eccentricity of the stud 5 drawn in dotted lines, with reference to the driving shaft.

Turning to FIG. 1, it will be further understood that the rocking roller bearing 6 transmits its movement to the end of the shaft 7 and consequently to the basket spindle and to the basket to make them rock round the pin 13. As a consequence of the inertia of the basket system, the value of which inertia varies in direct relationship with the weight of the articles contained in the basket 26 at each oscillation, said system has a tendency to continue its movement whereby the ball bearing 6 has a tendency to compress the spindle head 7 against which it bears.

Obviously, the more the mass of the articles contained inside the basket 26 is large the more the pressure exerted by the ball bearing 6 on the spindle head 7 increases. Now, this spindle head and also the sleeve or cylinder 8 fitted over same are made of a plastic material bestowed with a certain elasticity, so that said parts will be deformed to a certain extent and will yield under the action of said pressure. Consequently, the amplitude of the movement will vary with the pressure exerted and consequently with the mass constituted by the basket 26 and the articles contained therein. The amplitude of the stirring movement is therefore directly proportional to the mass of the articles to be cleaned without the operator having to interfere in any manner, which forms a main feature of my invention.

It is apparent from the preceding disclosure that instead of linear oscillations defined by the line x—x' shown in FIG. 7, there is obtained a transverse secondary oscillation round the axis y—y'. Consequently, the basket 26 does not describe merely a straight line during its reciprocation but it follows a path substantially in the shape of two half-ellipses, the size of which varies in accordance with the amplitude of the movement; the articles carried in the basket 26 will be subjected to a compound stirring adapted to ensure their perfect cleaning.

As specified hereinabove, the basket-carrying spindle made of a plastic material bestowed with a certain elasticity allows upon elongation thereof an increase in the sensitivity of the machine; however, in practice, the elasticity of the above-mentioned parts described as being made of plastic material is sufficient for producing satisfactory results.

What I claim is:

1. In a machine for cleaning articles under stirring conditions and for draining the cleaned articles, the combination of a container for said articles adapted to be filled with a treating liquid, a basket adapted to be immersed in the liquid in said container, a vertical basket-carrying spindle provided with a transverse slot of a slightly upwardly tapering shape, a stationary casing surrounding said spindle, collapsible means carrying the container and adapted to set the latter underneath the casing in vertical registry with the basket-carrying spindle, a vertically shiftable cylindrical bearing for the spindle provided with a port the outline of which registers with that of the port in the spindle, a sleeve coaxially resting on said cylindrical bearing, the sleeve and cooperating cylindrical bearing member being made of elastic plastic material, a motor carried by the casing, and including a motor shaft in substantial vertical alignment with the basket-carrying spindle, a member rigid with the lower end of the motor shaft and having an upwardly facing convex surface adapted to carry said sleeve, a stud rigid with said convex member and directed downwardly eccentrically of the motor shaft, a rotula ball bearing fitted round said stud and adapted to be revolubly fitted in the upper end of the cylindrical bearing, a stop rigid with the casing defining the lowermost position of the cylindrical bearing, means for raising the cylindrical bearing into engagement with the ball bearing and therewith the sleeve above theh convex carrier surface, said means including a tapering pin extending through the casing towards the registering ports in said spindle and cylindrical bearing, and means for shifting said pin to and out of said ports to ensure, upon complete engagement between the pin and the said ports, a raising movement of the spindle and cylinder and, upon release of said pin, a dropping of said spindle and sleeve into their lowermost position for which the sleeve rests on the convex carrier surface and the cylindrical member disengages the ball bearing, the vertical raising and dropping of the spindle providing selectively upon operation of the motor, an oscillatory stirring movement round the eccentric stud, and a rotary movement round the vertical axis of the spindle, the amplitude of said oscillating stirring movement being proportional to the weight carried by the basket under the action of the increased thrust exerted between the elastic sleeve and bearing member.

2. In a machine for cleaning articles under stirring conditions and for draining the cleaned articles, the combination of a container for said articles adapted to be filled with a treating liquid, a basket adapted to be immersed in the liquid in said container, a vertical basket-carrying spindle provided with a transverse slot of a slightly upwardly tapering shape, a stationary casing surrounding said spindle, collapsible means carrying the container and adapted to set the latter underneath the casing in vertical registry with the basket-carrying spindle, a vertically shiftable cylindrical bearing for the spindle provided with a port the outline of which registers with that of the port in the spindle, a sleeve coaxially resting on said cylindrical bearing, said spindle, sleeve and bearing member being made of elastic plastic material, a motor carried by the casing and including a motor shaft in substantial vertical alignment with the basket-carrying spindle, a member rigid with the lower end of the motor shaft and having an upwardly facing convex surface adapted to carry said sleeve, a stud rigid with said convex member and directed downwardly eccentrically of the motor shaft, a rotula ball bearing fitted round said stud and adapted to be revolubly fitted in the upper end of the cylindrical bearing, a stop rigid with the casing defining the lowermost position of the cylindrical bearing, means for raising the cylindrical bearing into engagement with the ball bearing and therewith the sleeve above the convex carrier surface, said means including a tapering pin extending through the casing towards the registering ports in said spindle and cylindrical bearing, and means for shifting said pin into and out of said ports to ensure, upon complete engagement between the pin and the said ports, a raising movement of the spindle and cylinder and, upon release of said pin, a dropping of said spindle and sleeve into their lowermost position for which the sleeve rests on the convex carrier surface and the cylindrical member disengages the ball bearing, the vertical raising and dropping of the spindle providing selectively upon operation of the motor, an oscillatory stirring movement round the eccentric stud along two successive substantially semi-elliptic paths between two extreme positions, a rotary movement round the vertical axis of the spindle, and means for selectively controlling the removal of the pin out of the ports simultaneously with the lowering of the container and the return of the pin into the ports simultaneously with the raising of the container into its operative position, the amplitude of said oscillating stirring movement being proportional to the weight carried by the basket under the action of the increased thrust exerted between the elastic sleeve and bearing member.

References Cited in the file of this patent

UNITED STATES PATENTS

| | | |
|---|---|---|
| 399,381 | Coffin | Mar. 12, 1889 |

FOREIGN PATENTS

| | | |
|---|---|---|
| 1,101,097 | France | Apr. 13, 1955 |